(12) United States Patent
Runde et al.

(10) Patent No.: US 6,732,038 B2
(45) Date of Patent: May 4, 2004

(54) TRANSMISSION GEAR SELECTION METHOD FOR ENHANCING THE EFFECTIVENESS OF VEHICLE ROCKING MANEUVERS

(75) Inventors: Jeffrey Kurt Runde, Fishers, IN (US); Andrew L. Mitchell, Indianapolis, IN (US); Scott E. Mundy, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 40 days.

(21) Appl. No.: 10/159,783

(22) Filed: May 31, 2002

(65) Prior Publication Data

US 2003/0225498 A1 Dec. 4, 2003

(51) Int. Cl.$^7$ ................................................ B60T 8/58
(52) U.S. Cl. .......................... 701/51; 701/74; 701/89; 180/338; 303/138; 303/173
(58) Field of Search ........................ 701/51, 36, 70, 701/71, 74, 89; 180/197, 338; 303/138, 143, 147, 166, 173, 190

(56) References Cited

U.S. PATENT DOCUMENTS

| | | | | |
|---|---|---|---|---|
| 4,070,927 A | | 1/1978 | Polak | ........................ 74/765 |
| 4,702,337 A | * | 10/1987 | Burckhardt et al. | ........ 180/197 |
| 5,005,663 A | * | 4/1991 | Niide et al. | ................. 180/247 |
| 5,586,815 A | * | 12/1996 | Negrin | ....................... 303/143 |
| 5,601,506 A | | 2/1997 | Long et al. | ................. 475/120 |
| 6,466,855 B2 | * | 10/2002 | Yamaguchi | ................. 701/70 |
| 2002/0007243 A1 | * | 1/2002 | Yamaguchi | ................. 701/89 |

FOREIGN PATENT DOCUMENTS

JP    2002029402 A  * 1/2002 ............. B60T/8/66

* cited by examiner

Primary Examiner—William A. Cuchlinski, Jr.
Assistant Examiner—Eric M Gibson
(74) Attorney, Agent, or Firm—Leslie C. Hodges

(57) ABSTRACT

An improved method of operation for a motor vehicle automatic transmission determines a vehicle speed for purposes of selecting a desired transmission gear at least in part based on the wheel speeds of the vehicle. If the vehicle is being operated in a two-wheel drive mode, the vehicle speed is determined based on an average of the speeds of the un-driven wheels; if the vehicle is being operated in a four-wheel drive mode, the vehicle speed is determined based on the lowest of the four wheel speeds. Optionally, the wheel speeds are only used to determine vehicle speed if the Reverse range of the transmission has been engaged within a specified time interval, and otherwise the vehicle speed is determined based on an output speed of the transmission.

5 Claims, 3 Drawing Sheets

US 6,732,038 B2

TRANSMISSION GEAR SELECTION METHOD FOR ENHANCING THE EFFECTIVENESS OF VEHICLE ROCKING MANEUVERS

TECHNICAL FIELD

This invention relates to a gear selection method for an electronically controlled motor vehicle transmission, and more particularly to a method that enhances the effectiveness of vehicle rocking maneuvers.

BACKGROUND OF THE INVENTION

When the forward or reverse momentum of a vehicle is lost on snow or soft ground to the point that it cannot be driven further, it may still be possible for the driver to recover sufficient momentum to continue driving by alternately shifting the transmission between forward and reverse speed ranges to rock the vehicle back and forth. In a vehicle equipped with a manual transmission, the driver is typically advised to shift between reverse and the first (highest numerical input/output ratio) forward gear for optimum rocking effectiveness. However, when the vehicle is equipped with an automatic transmission and the driver simply shifts between Reverse and Drive, the optimum forward gear is not always engaged, particularly if the wheel slip is relatively high. This occurs because forward gear selection in an automatic transmission is ordinarily determined as a function of the transmission output speed, which presumably corresponds to the vehicle speed. However, in rocking maneuvers, the transmission output speed is influenced more by wheel slip than vehicle speed, and the transmission controller will often schedule an upshift to the second or third forward gear based on the apparent vehicle speed. In some cases, the controller may even engage the second forward gear as soon as the driver shifts to Drive. In both cases, the effectiveness of the rocking maneuver is significantly degraded, and the driver may be unable to regain sufficient vehicle momentum to continue driving.

Although a transmission controller could theoretically be programmed detect the presence of a rocking maneuver, and to limit the forward speed range to the first gear during such maneuvers, it is difficult in practice to distinguish rocking maneuvers from other maneuvers for which forward range upshifting may be appropriate. Accordingly, what is needed is a transmission gear selection method that enhances the effectiveness of rocking maneuvers without preventing upshifting during normal vehicle operation.

SUMMARY OF THE INVENTION

The present invention is directed to an improved method of operation for a motor vehicle automatic transmission in which the vehicle speed for purposes of selecting a desired transmission gear is determined at least in part based on the wheel speeds of the vehicle. If the vehicle is being operated in a two-wheel drive mode, the vehicle speed is determined based on an average of the speeds of the un-driven wheels; if the vehicle is being operated in a four-wheel drive mode, the vehicle speed is determined based on the lowest of the four wheel speeds. Optionally, the foregoing methodology is only enabled if the Reverse range of the transmission has been engaged within a specified time interval, and otherwise the vehicle speed is determined based on an output speed of the transmission.

DESCRIPTION OF THE PREFERRED EMBODIMENT

Figures 1, 3:
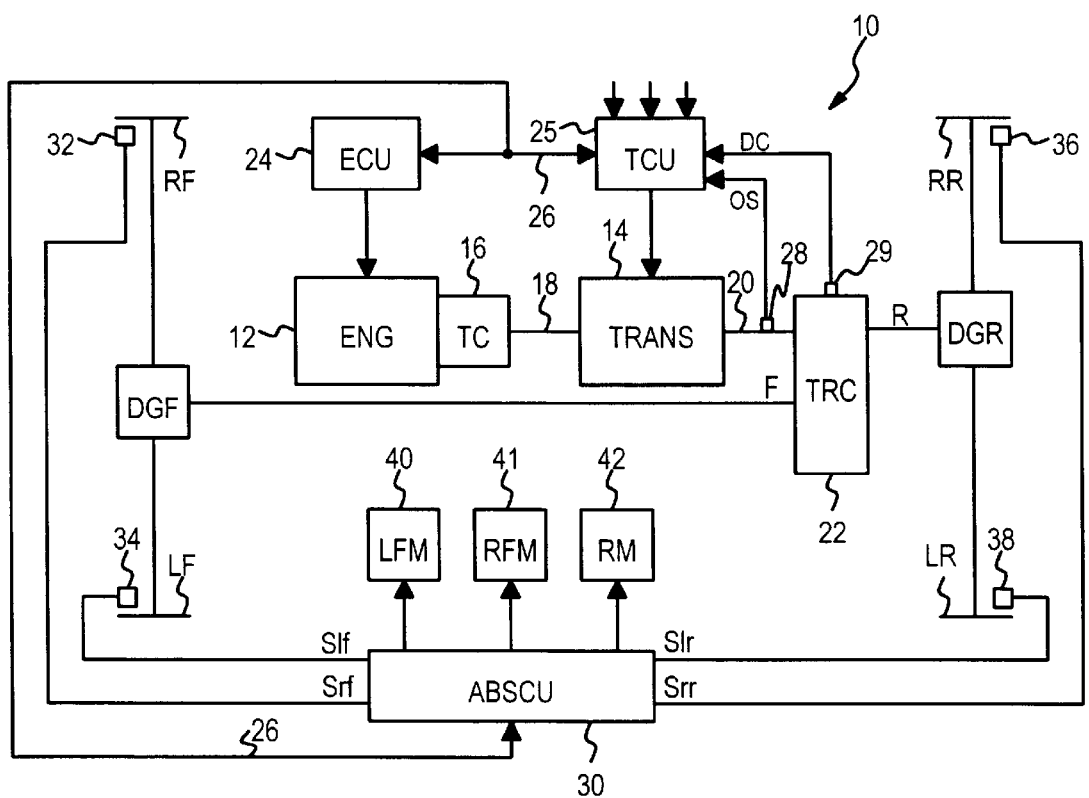
FIG. 1 is a diagram of a motor vehicle powertrain including an automatic transmission, a microprocessor-based transmission control unit, and an anti-lock brake system.
FIG. 3 is a table indicating a relationship between transmission clutch activation and corresponding speed ratio.

Referring to FIG. 1, the reference numeral 10 generally designates selected portions of a motor vehicle, including an engine 12, an automatic transmission 14, and a torque converter 16 providing a fluid coupling between engine 12 and transmission input shaft 18. In many vehicles, a torque converter clutch (TCC 19 in FIG. 2) may be included for selectively providing a mechanical coupling between engine 12 and transmission input shaft 18. The transmission output shaft 20 is coupled to the driving wheels of the vehicle in one of several conventional ways. The illustrated embodiment depicts a four-wheel drive (FWD) application in which the output shaft 20 is connected to a transfer case (TRC) 22 that is also coupled to a rear drive shaft R and a front drive shaft F. The rear drive shaft R is coupled to the left-rear and right-rear wheels LR, RR through a rear differential gearset DGR, and the front drive shaft F is coupled to the left-front and right-front wheels LF, RF through a front differential gearset DGF. Typically, TRC 22 is shift able to selectively establish one of several drive configurations, including various combinations of two-wheel drive and four-wheel drive, and high or low speed range.

In the illustrated embodiment, electronically-regulated engine control functions such fuel and spark timing controls are carried out by a microprocessor-based engine control unit (ECU) 24, electronically-regulated transmission control functions such as gear selection and clutch pressure control are carried out by a microprocessor-based transmission control unit (TCU) 25, and a data bus 26 couples ECU 24 to TCU 25 to facilitate data sharing. In some applications, the functionalities of ECU 24 and TCU 25 are combined in a single control unit which is commonly referred to as a powertrain control unit, or PCU. As indicated, the TCU 25 receives a number of inputs, including an output speed signal OS corresponding to the speed of transmission output shaft 20, and a drive configuration signal DC corresponding to the drive configuration established by TRC 22. The OS signal is developed by a suitable speed sensor 28 and the DC signal is developed by a position sensor 29 responsive to the displacement of one or more drive configuration elements within TRC 22.

The vehicle 10 is also equipped with an anti-lock braking system (ABS) including a microprocessor-based ABS control unit (ABSCU) 30, speed sensors 32, 34, 36, 38 for individually measuring the rotational speeds Srf, Slf, Srr, Slr of the vehicle wheels RF, LF, RR, LR, and a set of brake pressure modulators 40, 42, 44 for modulating the hydraulic brake pressure supplied to selected wheel brakes in response to brake-induced wheel slip as detected by the measured wheel speeds. In the illustrated embodiment, the modulators 40 (LFM) and 41 (RFM) are used to control the brake pressure for the left and right front wheels LF, RF, while the modulator 42 (RM) is used to control the brake pressure for both left and right rear wheels LR, RR. Of course, other configurations are also possible. Also, as with ECU 24 and TCU 25, the data bus 26 is coupled to ABSCU 30 to facilitate data sharing; as indicated above and explained below, such data sharing capability is particularly important to the method of the present invention in which the measured wheel speeds Srf, Slf, Srr, Slr are used by TCU 25 in scheduling forward gear engagement in transmission 14.

Figure 2:
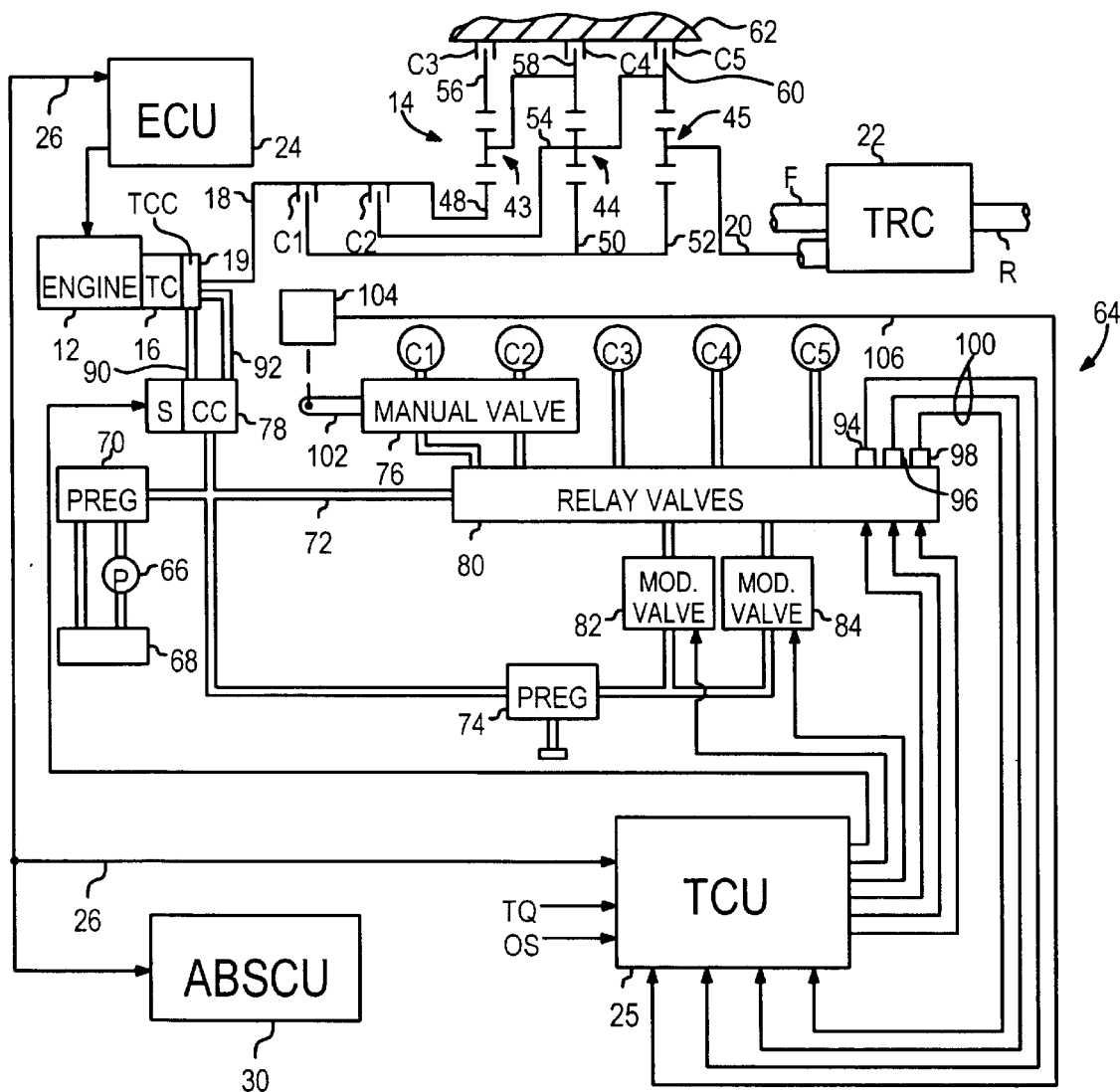
FIG. 2 is a diagram of the automatic transmission of FIG. 1.

Referring to FIG. 2, the transmission 14 of the illustrated embodiment is a planetary gearset transmission of the type described in the U.S. Pat. No. 4,070,927 to Polak, and includes an electro-hydraulic control of the type described in U.S. Pat. No. 5,601,506 to Long et al. Accordingly, the gearset and control elements shown in FIG. 2 have been greatly simplified, it being understood that further information regarding the gear element mechanizations, fluid pressure routings, and so forth, may be found in the aforementioned patents, which are incorporated herein by reference.

As shown, the illustrated transmission 14 has three interconnected planetary gearsets, designated generally by the reference numerals 43, 44 and 45. The transmission input shaft 18 continuously drives a sun gear 48 of gearset 43, selectively drives the sun gears 50, 52 of gearsets 44, 45 via clutch C1, and selectively drives the carrier 54 of gearset 44 via clutch C2. The ring gears 56, 58, 60 of gearsets 43, 44, 45 are selectively connected to ground 62 via clutches C3, C4 and C5, respectively.

As diagrammed in the table of FIG. 3, the state of the clutches C1–C5 (i.e., engaged or disengaged) can be controlled to provide six forward gears or ratios (1, 2, 3, 4, 5, 6), a reverse speed gear (R) or a neutral condition (N). For example, the first (highest numerical input/output speed ratio) forward gear is achieved by engaging clutches C1 and C5. Shifting from one forward gear to another is generally achieved by disengaging one clutch (referred to as the off-going clutch) while engaging another clutch (referred to as the on-coming clutch). For example, the transmission 14 is shifted from first gear to second gear by disengaging clutch C5 while engaging clutch C4.

The torque converter clutch 19 and the transmission clutches C1–C5 are controlled by an electro-hydraulic control system, generally designated by the reference numeral 64. The hydraulic portions of the control system 64 include a pump 66 which draws hydraulic fluid from a reservoir 68, a pressure regulator 70 which returns a portion of the pump output to reservoir 68 to develop a regulated pressure in line 72, a secondary pressure regulator valve 74, a manual valve 76 activated by a driver-manipulated shift selector, and a number of solenoid-operated fluid control valves 78, 80, 82, 84. The electronic portion of the control is primarily embodied in TCU 26, which selects a desired transmission speed ratio based on engine torque (TQ) or throttle position and vehicle speed (VS), and suitably activates the solenoid-operated fluid control valves 78, 80, 82, 84 to achieve the desired speed ratio. Additionally, the control lever 102 of manual valve 76 is coupled to a sensor and display module 104 that produces an diagnostic signal on line 106 based on the control lever position; such signal is conventionally referred to as a PRNDL signal, since it indicates which of the transmission ranges (Park, Reverse, Neutral, Drive or Low) has been selected by the driver. Finally, the fluid control valves 80 (also referred to as Relay Valves) are provided with pressure switches 94, 96, 98 for supplying diagnostic signals to TCU 26 on lines 100 based on the respective relay valve positions. The TCU 26, in turn, monitors the various diagnostic signals for the purpose of electrically verifying proper operation of the controlled elements.

The solenoid-operated fluid control valves 78, 80, 82, 84 are generally characterized as being either of the on/off or modulated type. To reduce cost, the electro-hydraulic control system 64 is configured to minimize the number of modulated fluid control valves, as modulated valves are generally more expensive to implement. To this end, the Relay Valves 80 comprise a set of three on/off valves that are utilized in concert with manual valve 76 to enable controlled engagement and disengagement of each of the clutches C1–C5 with only two modulated valves 82, 84. For any selected ratio, TCU 26 activates a particular combination of Relay Valves 80 via lines 108 for coupling one of the modulated valves 82, 84 to the on-coming clutch, and the other modulated valve 82, 84 to the off-going clutch.

The modulated valves 82, 84 each comprise a conventional pressure regulator valve biased by a variable pilot pressure that is developed by current controlled force motor. The fluid-controlled valve (CC) 78 is also a modulated valve, and controls the supply fluid supply path to converter clutch 19 in lines 90, 92 for selectively engaging and disengaging the converter clutch 19. The TCU 26 determines pressure commands for smoothly engaging the on-coming clutch while smoothly disengaging the off-going clutch, develops corresponding force motor current commands, and then supplies current to the respective force motors in accordance with the current commands.

Figure 4:
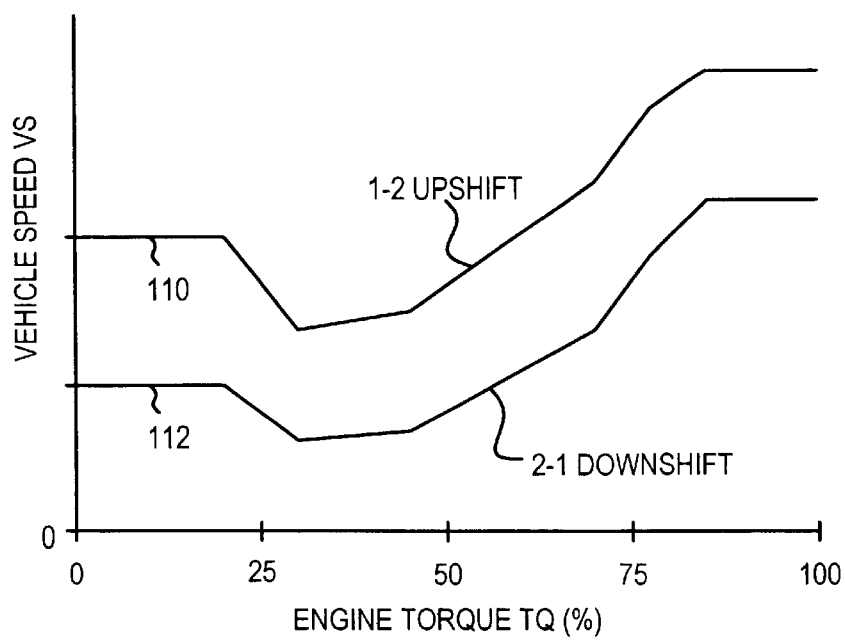
FIG. 4 is a graph illustrating selection of a desired transmission gear based on vehicle speed and engine torque.

The present invention is particularly directed to the selection of the desired forward gear for transmission 14. As mentioned above, the desired gear is selected as a function of engine torque TQ or throttle position and vehicle speed VS using a stored shift pattern, as typified by the traces 110 and 112 in FIG. 4. When the first forward gear is engaged, an upshift to second gear is initiated if and when the vehicle speed VS for the current engine torque (or throttle) setting TQ rises above the trace 110. Conversely, when the second forward gear is engaged, a downshift to first gear is initiated if and when the vehicle speed for the current engine torque (or throttle) setting TQ falls below the trace 112. In a conventional control, a speed sensor such as the sensor 28 of FIG. 1 is utilized to measure the speed of transmission output shaft 20, and the measured speed is used as the vehicle speed VS. As explained above, however, this approach produces undesired results in driving situations where there is significant wheel slip, such as during rocking maneuvers when the range selector is alternately shifted between Reverse and Drive to dislodge a vehicle stuck in snow or muddy ground. In such situations, the wheel slip of the driven wheels can produce a vehicle speed measurement that far exceeds the actual vehicle speed, leading TCU 25 to set the desired forward gear to second or third instead of first. In cases where the wheel slip occurs very quickly, TCU 25 may even select the second forward gear before the first gear can be fully engaged. In either case, the effectiveness of the rocking maneuver is significantly degraded, and the driver may be unable to regain sufficient vehicle momentum to continue driving.

According to the present invention, the aforementioned difficulty is avoided by setting the vehicle speed VS at least in part as a function of the wheel speeds Slf, Srf, Slr, Srr of the vehicle 10. If TRC 22 is configured to provide a two-wheel drive mode, the vehicle speed VS is determined based on an average of the speeds of the un-driven wheels— that is, the average of wheel speeds Slf and Srf in the case of rear wheel drive, and the average of Slr and Srr in the case of front wheel drive. If TRC 22 is configured to provide a four-wheel drive mode, the vehicle speed VS is determined based on the lowest of the four wheel speeds Slf, Srf, Slr, Srr. Optionally, the wheel speeds Slf, Srf, Slr, Srr are only utilized to determine the vehicle speed VS if the Reverse range of transmission 14 has been engaged within a specified time interval such as 20 seconds; otherwise, the vehicle speed VS is determined based on the measured speed OS of the transmission output shaft 20.

Figure 5:
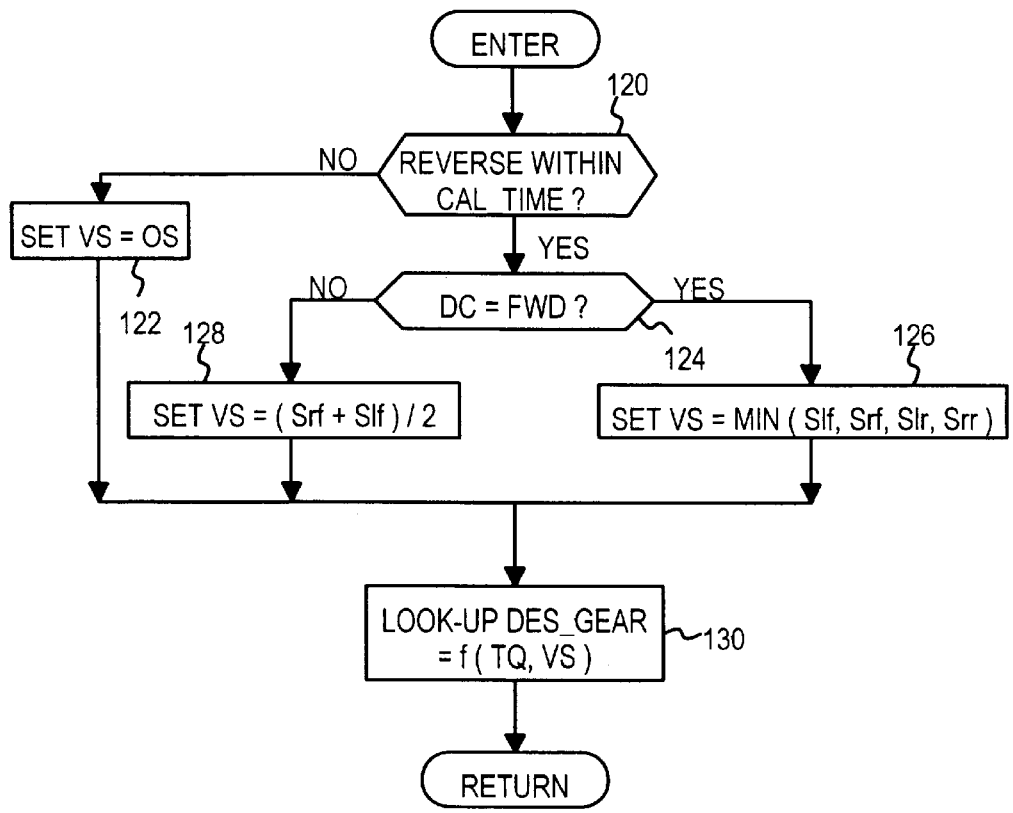
FIG. 5 is a flow diagram representative of computer program routine executed by the transmission control unit of FIG. 1 in carrying out the control of this invention.

The flow diagram of FIG. 5 represents a computer program routine periodically executed by TCU 25 to carry out the foregoing method of operation in the context of a vehicle in which the rear wheels LR, RR are driven in the two-wheel drive configuration. Referring to FIG. 5, the block 120 is first executed to determine if the Reverse range has been engaged in the previous CAL_TIME seconds, where CAL_TIME is a calibrated value such as 20 seconds. If not, the existence of a rocking maneuver is unlikely, and the block 122 sets the vehicle speed VS equal to the measured output speed OS. If block 120 is answered in the affirmative, the block 124 checks the drive configuration signal DC to determine if the vehicle is being operated in four-wheel drive (FWD) or two-wheel drive. If DC=FWD, the block 126 is executed to set the vehicle speed VS according to the minimum of Slf, Srf, Slr and Srr. Otherwise, the block 128 is executed to set VS according to the average of Slf and Srf—that is, (Srf+Srf)2. Finally, the block 130 is executed to determine the desired forward gear DES_GEAR by table look-up as a function of VS and the engine torque TQ or throttle position, completing the routine.

Using the simple and reliable methodology described above, the upshifting to the second or higher forward gear of transmission 14 is effectively prevented during rocking maneuvers, even though the transmission output speed is relatively high due to wheel slip. As a result, the effectiveness of rocking maneuvers is significantly enhanced, but upshifting of the transmission during normal vehicle operation is unaffected.

While the present invention has been described in reference to the illustrated embodiment, it is expected that various modifications in addition to those mentioned above will occur to those skilled in the art. For example, the blocks 120 and 122 of FIG. 5 could be eliminated, if desired, and the block 128 can be modified to set VS equal to the average of the rear wheel speeds in the case of a front-wheel drive vehicle. Thus, it will be understood that methods incorporating these and other modifications may fall within the scope of this invention, which is defined by the appended claims.

What is claimed is:

1. A method of operation for a motor vehicle powertrain including an engine driving two or more vehicle wheels through an automatic shift transmission that provides a reverse gear and two or more forward gears, where the reverse gear is engaged when a range selector is positioned to select reverse movement of the vehicle and one of the forward gears is engaged when the range selector is positioned to select forward movement of the vehicle, the method comprising the steps of:

selecting a desired forward gear to engage based on an engine load parameter and an indication of vehicle speed;

detecting an engagement of the reverse gear;

if the reverse gear has not been engaged for a calibrated interval of time, determining said indication of vehicle speed based on an output speed of said transmission;

if the reverse gear has been engaged within said calibrated interval of time, and less than all of the vehicle wheels are being driven through the transmission, measuring a speed of one or more un-driven wheels and determining said indication of vehicle speed based on such un-driven wheel speed; and if the reverse gear has been engaged within said calibrated interval of time, and all of the vehicle wheels are being driven through the transmission, measuring a speed of each driven wheel, and determining said indication of vehicle speed based on such driven wheel speeds.

2. The method of operation of claim 1, where the vehicle includes four wheels, and if the reverse gear has been engaged within said calibrated interval of time, and only two of the vehicle wheels are being driven through the transmission, the method includes the steps of:

measuring the speed of each un-driven wheel; and determining said indication of vehicle speed based on an average of such measured un-driven wheel speeds.

3. The method of operation of claim 1, where the vehicle includes four wheels, and if the reverse gear has been engaged within said calibrated interval of time, and all of the vehicle wheels are being driven through the transmission, the method includes the steps of:

measuring the speed of each driven wheel; and determining said indication of vehicle speed based on the lowest of such measured driven wheel speeds.

4. The method of operation of claim 1, where the vehicle includes an anti-lock braking system that measures speeds of the vehicle wheels to detect wheel slip, the method including the step of:

obtaining the measured wheel speeds from the anti-lock braking system.

5. The method of operation of claim 1, wherein the powertrain includes a transfer case coupling the transmission to the vehicle wheels, the method including the step of:

measuring a state of the transfer case to determine if the all or less than all of the wheels are being driven through the transmission.

* * * * *